United States Patent
Eades et al.

(10) Patent No.: US 7,037,432 B2
(45) Date of Patent: May 2, 2006

(54) BUOYANT MEDIA FLOTATION

(75) Inventors: Andrew Eades, Pittsburgh, PA (US); Jeffrey Penno, Pittsburgh, PA (US)

(73) Assignee: The F.B. Leopold Co., Inc., Zelienople, PA (US)

( * ) Notice: Subject to any disclaimer, the term of this patent is extended or adjusted under 35 U.S.C. 154(b) by 0 days.

(21) Appl. No.: 11/087,846

(22) Filed: Mar. 23, 2005

(65) Prior Publication Data
US 2005/0161406 A1    Jul. 28, 2005

Related U.S. Application Data

(62) Division of application No. 09/506,780, filed on Feb. 18, 2000, now Pat. No. 6,890,431.

(51) Int. Cl.
*C02F 1/24* (2006.01)

(52) U.S. Cl. .......................... 210/705; 209/5; 210/711; 210/712; 210/713; 210/727

(58) Field of Classification Search .................... 209/5; 210/703–705, 711, 712, 726, 727
See application file for complete search history.

(56) References Cited

U.S. PATENT DOCUMENTS

| | | | |
|---|---|---|---|
| 1,250,303 A | 12/1917 | Gregnawalt | |
| 2,729,334 A | 1/1956 | Schwarz et al. | |
| 2,793,185 A * | 5/1957 | Albrektsson et al. | 210/703 |
| 2,994,432 A | 8/1961 | Schluter | |
| 3,087,710 A | 4/1963 | Dujardin | |
| 3,147,217 A | 9/1964 | Halton | |
| 3,179,252 A * | 4/1965 | Vrablik | 210/120 |
| 3,192,155 A | 6/1965 | Bready et al. | |
| 3,224,582 A * | 12/1965 | Iannicelli | 209/166 |
| 3,268,443 A | 8/1966 | Cann | |
| 3,313,795 A | 4/1967 | Rubin | |
| 3,314,880 A | 4/1967 | Rubin | |
| 3,350,302 A | 10/1967 | Demeter et al. | |
| 3,377,271 A | 4/1968 | Cann | |
| 3,440,166 A | 4/1969 | Davis et al. | |
| 3,637,490 A * | 1/1972 | Gardner et al. | 210/705 |
| 3,834,541 A | 9/1974 | Rundell et al. | |
| 3,966,598 A * | 6/1976 | Ettelt | 210/703 |
| 4,001,114 A | 1/1977 | Joseph et al. | |
| 4,104,341 A | 8/1978 | Keppler et al. | |
| 4,156,648 A * | 5/1979 | Kuepper | 210/752 |
| 4,203,837 A | 5/1980 | Hoge et al. | |
| 4,274,968 A | 6/1981 | Grutsch et al. | |
| 4,388,195 A | 6/1983 | von Hagel et al. | |
| 4,448,696 A | 5/1984 | White, Jr. | |

(Continued)

FOREIGN PATENT DOCUMENTS

EP    417367 A1    3/1991

OTHER PUBLICATIONS

EC Kagaku Kogyo KK; Waste water purifen. by coagulative flotation-by addn. of organic coagulant and inorganic hollow particles; Dec. 26, 1974 (abstract).

*Primary Examiner*—Peter A. Hruskoci
(74) *Attorney, Agent, or Firm*—The Webb Law Firm

(57) ABSTRACT

A clarification system for fluids in which particles are separated from the fluid by flotation and in which the buoyant media inducing the flotation is recycled. Flotation can be assisted by a flotation assistance device, such as dissolved air flotation.

7 Claims, 3 Drawing Sheets

U.S. PATENT DOCUMENTS

| | | |
|---|---|---|
| 4,539,119 A | 9/1985 | Cann |
| 4,559,146 A | 12/1985 | Roets |
| 4,626,356 A | 12/1986 | Suzuki et al. |
| 4,738,750 A | 4/1988 | Ackel |
| 4,844,873 A * | 7/1989 | Lebon et al. ............... 423/12 |
| 4,863,606 A | 9/1989 | Ryall |
| 4,927,543 A | 5/1990 | Bablon et al. |
| 4,957,633 A | 9/1990 | Suutarinen |
| 5,039,428 A | 8/1991 | Wentzler et al. |
| 5,453,205 A | 9/1995 | Browne |
| 5,538,631 A | 7/1996 | Yeh |
| 5,637,221 A | 6/1997 | Coyne |
| 5,728,304 A * | 3/1998 | Yeh ........................... 210/703 |
| 5,730,864 A | 3/1998 | Delsalle et al. |
| 5,770,091 A | 6/1998 | Binot et al. |
| 5,779,908 A | 7/1998 | Anderson et al. |
| 5,798,046 A | 8/1998 | Greer et al. |
| 5,800,717 A | 9/1998 | Ramsay et al. |
| 5,855,769 A | 1/1999 | Firth et al. |
| 5,863,441 A | 1/1999 | Krofta |
| 5,900,154 A | 5/1999 | Henriksen |
| 6,890,431 B1 * | 5/2005 | Eades et al. ............. 210/195.1 |
| 6,896,815 B1 * | 5/2005 | Cort .......................... 210/695 |

\* cited by examiner

BUOYANT MEDIA FLOTATION

CROSS-REFERENCE TO RELATED APPLICATIONS

This application is a divisional of U.S. application Ser. No. 09/506,780 filed Feb. 18, 2000, now U.S. Pat. No. 6,890,431.

BACKGROUND OF THE INVENTION

1. Field of the Invention

The present invention relates to treatment systems for clarification of a fluid stream and, more particularly, to buoyant media introduced into the flow to induce a rising force on particles to be removed from the fluid.

2. Background of the Invention

Technologies for the separation of components of a fluid stream on the basis of density are well known in the art. The simplest systems rely on differences in densities alone to accomplish this separation, with heavier components settling, in the absence of agitation, to the bottom of the fluid for removal.

For small particles, the time required for the unassisted settling process can be unacceptably long. Stokes' Law predicts that spherical particles suspended in a fluid medium settle at a rate proportional to the second power of the particle diameter. Thus, large particles will settle much faster than smaller ones. To increase the rate of settling, coagulants can be used. A coagulant is a substance that produces a loosely-massed precipitate. As the precipitate forms, it entraps solid particles contained in the fluid. Aluminum sulfate and ferric sulfate are among the materials used in the art as coagulants.

Particles in solution often have a net surface charge. As a result, they tend to repel each other and resist the formation of agglomerates. Coagulation is the process whereby these repulsive charges are neutralized. After charge neutralization, the particles begin to collect into larger aggregates. This agglomeration process is known as flocculation; the resulting aggregate is known as a floc. Flocculant aids are thus effective as solid-liquid separating agents. Flocculant aids are typically synthetic water soluble polymers based on acrylamide. There are some natural occurring polymers, such as chitosan, that can be used for this purpose.

Entrainment can be used in conjunction with flocculation to expedite the separation process. For example, grains of sand can be introduced to the fluid to be treated. The floc that forms entraps the grains of sand, and the density of the floc is increased as is its settling speed. Alternatively, bubbles may be generated as the floc is formed, and their entrainment produces a floc that rises to the surface of the fluid rather than settling to the bottom. However, additional equipment and operating expenses are required to generate the bubbles. Other settling media may be selected on the basis of specific gravity, particle size, surface properties, or chemical properties. Increasing the concentration of these settling media improves the efficiency of the flocculation process, because more particle collisions result and the size of the resulting agglomerated particles increases more rapidly. Also, the settling capacity of the system increases with concentration. However, increasing the concentration of entrained materials increases the cost of the separation process, and increases the volume of the waste materials produced. For settling media with specialized properties, these cost constraints can be significant.

Solids separation processes employing settling inherently require energy in the flocculation stage, produce large volumes of sludge, produce effluent with small, difficult to settle particles, and require large, complex process vessels. These characteristics lead to increased costs. Accordingly, a need exists to reduce the costs associated with solids separation in high rate fluid clarification systems.

SUMMARY OF THE INVENTION

In order to meet this need, the present invention is a clarification system for fluids, in which particles are separated from the fluid by flotation and in which a buoyant media inducing the flotation is recycled. Buoyant media separation processes according to the invention offer a number of advantages over settling media processes according to the invention. Less energy is required in the flocculation stage in a buoyant media separation process. The volume of sludge produced is lower, and the sludge solids concentration is higher; no further sludge concentration is required. Also, process vessel depth is substantially less for buoyant media separation processes, and process vessel construction is simpler and more economical.

Fluid to be treated passes into a mixing chamber in which it is mixed rapidly with coagulants and flocculants. The resulting mixture then passes into a flocculation chamber in which the buoyant media are added and mixed and in which the flocculation process produces agglomerated particles. The product of the flocculation chamber passes into a flotation chamber. The flotation chamber is configured so that the removal of clarified fluid draws the fluid entering the chamber upward, hastening the generation of a sludge layer containing separated particles and buoyant media at the top of the chamber.

Optionally, the flotation chamber can be equipped with a flotation assistance device, such as dissolved air flotation, diffused air, or froth flotation system, to further hasten the flow of separated particles and buoyant media upward. In addition, lamella plates, tubes or other coalescing surfaces can be added to the flotation chamber to improve the separation of the buoyant flocs. Submerged membrane systems can be provided in the separation tank to remove the need for downstream filtration systems.

The clarified fluid obtained from the separation of sludge is removed from the bottom of the flotation chamber, and is optionally filtered. The sludge layer is removed from the top of the flotation chamber by any of a number of methods of removal well known in the art, such as a mechanical skimmer or by hydraulic desludging. The sludge layer then passes into a buoyant media recovery unit, wherein the buoyant media are separated from the sludge stream. The sludge stream is disposed of and the buoyant media are recycled into the flocculation chamber. The buoyant media recovery unit can make use of various types of devices to effect the separation, such as a centrifugal separator, centrifugal screener, cross-flow sieve, or vibratory screen separator. Alternately, the flocs can be subjected to shearing forces to separate the media from the waste particles, and the two phases are then allowed to separate.

DETAILED DESCRIPTION OF THE PREFERRED EMBODIMENT

The high rate clarification system of this invention makes use of high concentrations of particles of a buoyant media. The high concentrations improve the efficiency of flocculation and enable the system to produce a high rate of flotation.

Figure 1:
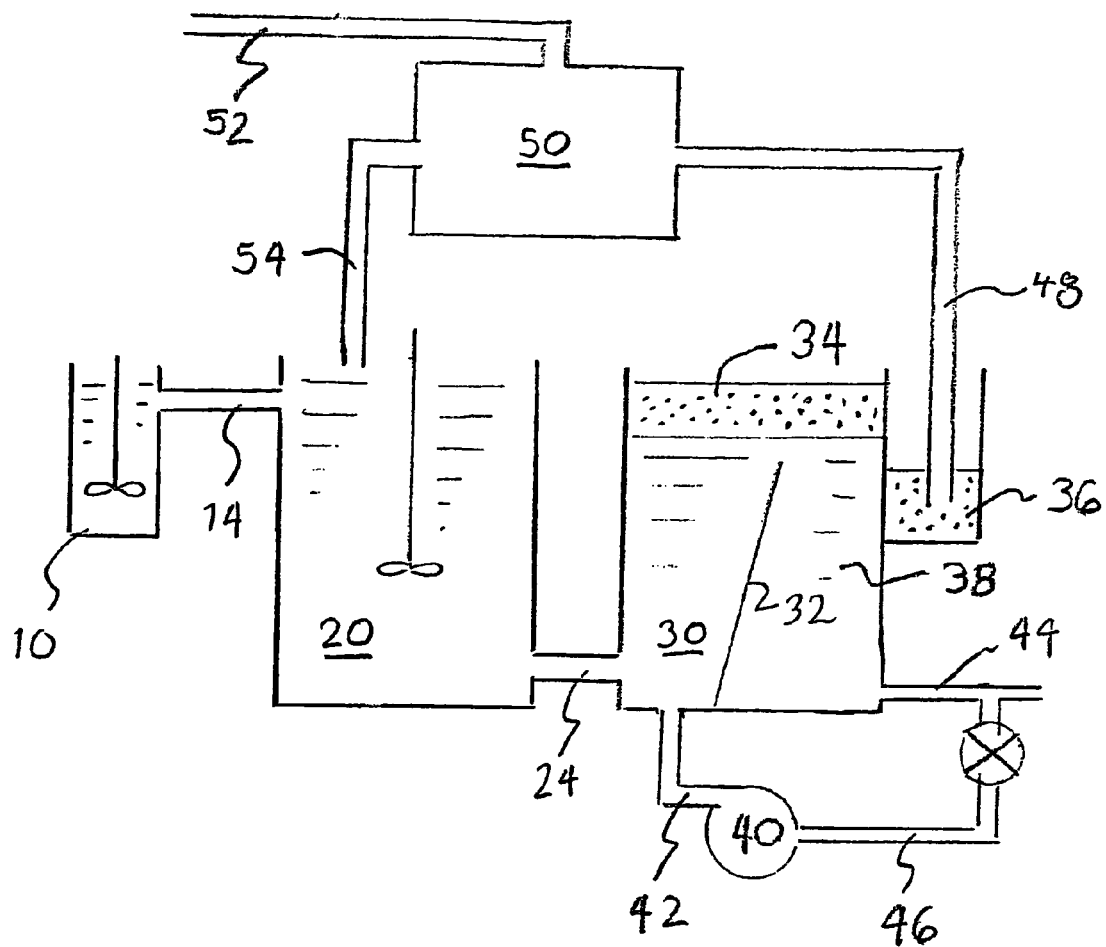
FIG. 1 is a schematic diagram of components and the pattern of flow of the clarifier device of the present invention.

Referring to FIG. 1, fluid to be treated flows into a mixing chamber 10. A coagulant is added to the fluid in this chamber 10. The coagulants are typically metal salts, such as aluminum sulfate, ferric sulfate, or PAC1, or can be any of the coagulant-type polymers currently offered by chemical suppliers. The amount of coagulant needed depends on factors, such as the concentration of solids to be removed from the fluid, but is typically in the range of 5 and 180 milligrams per liter of fluid.

After coagulant is added, the resulting mixture passes through a flocculation chamber feed line 14 into a flocculation chamber 20. In the flocculation process, aggregate suspended particles grow in size as they combine. Buoyant media and a flocculant aid are added to the fluid mixture in chamber 20. A flocculant is added to chamber 20 with the buoyant media. Typical flocculants for this application are synthetic water soluble polymers based on acrylamide. There are also some naturally occurring polymers that can be used such as chitosan. The amount of flocculant needed depends on factors, such as the concentration of solids to be removed from the fluid, but is typically in the range of 0.1 to 1.0 milligrams per liter of fluid. In the flocculation process, aggregate suspended particles grow in size as they combine. The buoyant media may be finely divided solids, but may also be solids that have been foamed or otherwise provided with internal voids. The buoyant media may include a plastic powder which has a specific gravity less than 1.0. The plastic can be, for example, polypropylene or polyethylene, but there are various other lightweight materials that can be used. Particle size for the buoyant media may be in the range of 10 to 500 microns, preferably in the range of 30 to 250 microns. The media will typically be added at a rate of 0.1 to 5 grams per liter of fluid mixture.

The fluid mixture, containing coagulants, flocculants, buoyant media, and the solids to be separated, then passes through a flotation chamber feed line 24, into a flotation chamber 30. Flotation chamber 30 is configured so that entering fluid is directed upward, expediting the flotation process. A baffle 32 is an example of a structure directing entering fluid upward. The action of the buoyant media, in conjunction with the coagulant and flocculant, results in the formation of a thick sludge layer 34 at the top of flotation chamber 30. The lower region of the flotation chamber contains no outlet or mechanism for the removal of solids; all solids removed from flotation chamber 30 are removed from the upper region of flotation chamber 30. The sludge layer 34 is separated from the flotation chamber 30 into a sludge hopper 36. The separation can be effected by a chain-and-flight or reciprocating skimmer or other sludge removal device. Sludge can also be removed from the chamber 30 by hydraulic desludging. The removal of sludge, coagulant, and flocculant is effected from the upper region of flotation chamber 30. A clarified fluid 38 is formed by the removal of coagulant and flocculant from the entering fluid by the buoyant media. Optionally, a flotation assistance device 40 can be used to further hasten the flow of separated particles and buoyant media upward. Flotation assistance device 40 may be a dissolved air flotation (DAF) system or DAF pump, or dispersed air system or blower. The output from flotation assistance device 40 enters flotation chamber 30 through a flotation assistance line 42.

Figure 2:
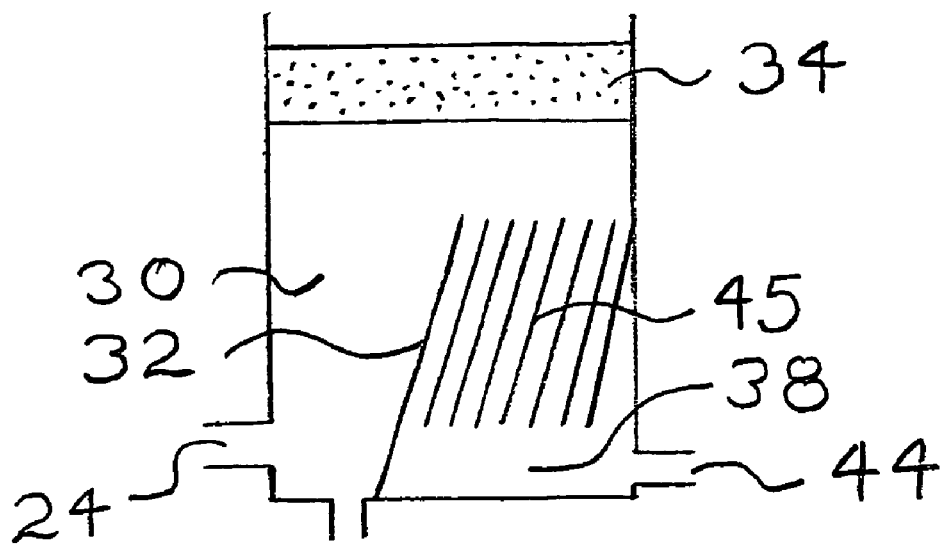
FIG. 2 is a schematic diagram of a flotation chamber of the present invention, including lamella plates.
Figure 3:
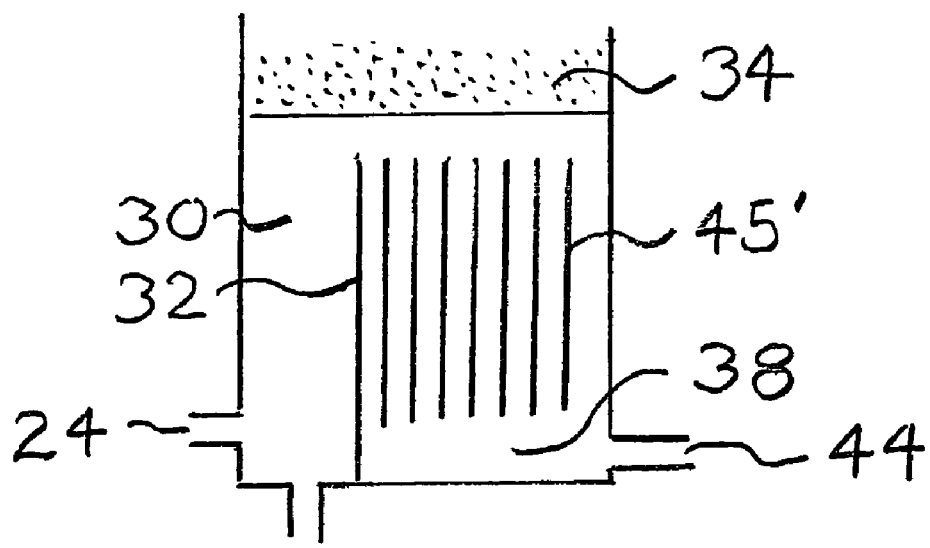
FIG. 3 is a schematic diagram of a flotation chamber of the present invention, including tubes.
Figure 4:
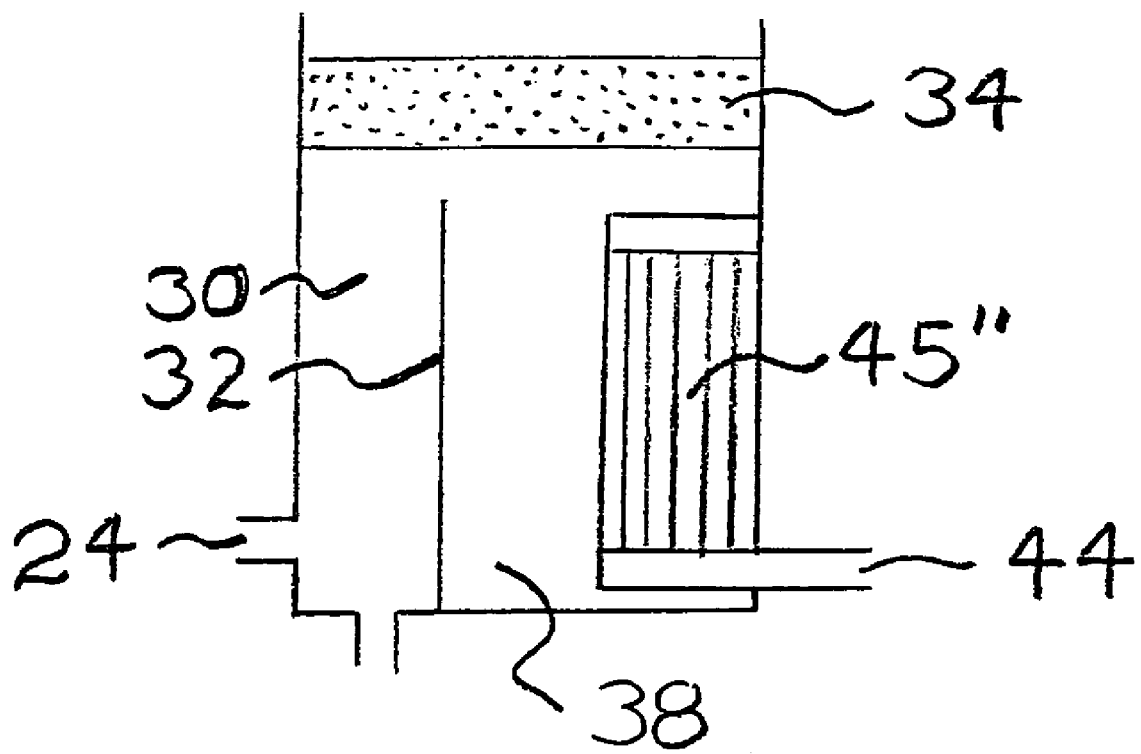
FIG. 4 is a schematic diagram of a flotation chamber of the present invention, including an immersed membrane module.

Clarified fluid 38 is withdrawn from flotation chamber 30 through a clarified fluid withdrawal line 44 or other process outlet. Lamella plates 45, tubes 45' or an immersed membrane module 45" can be added to the flotation cell to hasten the separation process as shown in FIG. 2, FIG. 3 and FIG. 4. Optionally, a portion of the clarified fluid 38 can be recycled through a clarified fluid recycling line 46 to flotation assistance device 40.

The sludge layer 34 is removed from sludge tank 36 through a sludge line 48 to a buoyant media recovery unit 50. Buoyant media recovery unit 50 may make use of a screening device to recover the buoyant flotation media, such as a vibratory separator, centrifugal screener, or a cross-flow sieve. The screens used are sized to selectively remove the buoyant flotation particles. Other separation devices, such as centrifuges, hydrocyclones, or fluidized bed classifiers, may also be used. The separated sludge is removed from buoyant media recovery unit 50 through a separated sludge line 52. The separated buoyant flotation particles are removed from buoyant media recovery unit 50 through a buoyant flotation particle recycling line 54 and recycled into flocculation chamber 20.

Having described the currently preferred embodiment of the present invention, it is to be understood that the invention may be otherwise embodied within the scope of the appended claims. For example, the modular tanks 10, 20 and 30 in FIG. 1 with pipe connections 14, 24 may be replaced by a single large tank (not shown) having appropriate over-weir and under-weir devices to define separate chambers which are fluidly connected in the same general manner as shown in FIG. 1.

We claim:

1. A process for separating suspended material from a fluid in a system comprising a flocculation chamber, a flotation chamber, a buoyant media recovery unit and a recycling line, said process comprising:
   (a) adding at least one coagulant and/or at least one flocculant to said fluid in said flocculant chamber to form a mixed fluid;
   (b) adding buoyant media to the mixed fluid;
   (c) directing the mixed fluid to said flotation chamber and separating the suspended material and buoyant media from the mixed fluid by flotation resulting in floating sludge being formed in an upper portion of the flotation chamber and clarified fluid formed in a lower portion of the flotation chamber;
   (d) removing the floating sludge from the flotation chamber;
   (e) removing clarified fluid from the lower portion of the flotation chamber;
   (f) removing separated sludge from the solid buoyant media in said buoyant media recovery unit; and
   (g) recycling at least a portion of said solid buoyant media after separation in step (f), via said recycling line, to said flocculation chamber.

2. The process of claim 1 in which a portion of the clarified fluid is recycled to the flotation chamber.

3. The process of claim 1 in which the buoyant media are finely divided solids with a specific gravity less than 1.0.

4. The process of claim 1 in which the buoyant media are solids provided with internal voids.

5. The process of claim 1 additionally comprising introducing a gas to the mixed fluid in a lower portion of the flotation chamber in step c).

6. The process of claim 5 wherein the gas is dissolved air.

7. The process of claim 1 including in step c) the further step of passing the mixed fluid along an upwardly directed baffle in the flotation chamber.

* * * * *